(12) United States Patent
Sato (10) Patent No.: US 12,462,945 B2
(45) Date of Patent: Nov. 4, 2025

(54) POWER SOURCE DEVICE AND POWER GENERATION METHOD UTILIZING RADIOACTIVE ENERGY DUE TO ALPHA DECAY

(71) Applicant: Hiroshi Sato, Atsugi (JP)

(72) Inventor: Hiroshi Sato, Atsugi (JP)

( * ) Notice: Subject to any disclaimer, the term of this patent is extended or adjusted under 35 U.S.C. 154(b) by 0 days.

(21) Appl. No.: 19/100,712

(22) PCT Filed: Jan. 26, 2023

(86) PCT No.: PCT/JP2023/002542
§ 371 (c)(1),
(2) Date: Jun. 25, 2025

(87) PCT Pub. No.: WO2024/029105
PCT Pub. Date: Feb. 8, 2024

(65) Prior Publication Data
US 2025/0316401 A1 Oct. 9, 2025

(30) Foreign Application Priority Data

Aug. 4, 2022 (JP) .................................. 2022-125136

(51) Int. Cl.
*G21H 1/10* (2006.01)
(52) U.S. Cl.
CPC .................................. *G21H 1/103* (2013.01)
(58) Field of Classification Search
CPC .................................................... G21H 1/103
USPC .................................................. 310/301, 306
See application file for complete search history.

(56) References Cited

U.S. PATENT DOCUMENTS

2010/0258156 A1* 10/2010 Inatomi .................. H10N 10/13
136/205
2022/0139588 A1 5/2022 Heibel et al.

FOREIGN PATENT DOCUMENTS

JP 2010-135183 A 6/2010
WO 2021/159043 A1 8/2021

OTHER PUBLICATIONS

Hakko, "No. 3, Let's Make a Thermocouple Battery", https://www.hakko.co.jp/expe/new/exnew0301.htm, Hakko Electric Co, Ltd., Nov. 2004.

(Continued)

*Primary Examiner* — Eric Johnson
(74) *Attorney, Agent, or Firm* — Morgan, Lewis & Bockius LLP (57) ABSTRACT

Voltage power source device having a connected structure in which each one of ends of a first metal and a second metal that generate the Seebeck effect are connected by a one-end side bonding part in which uranium and thorium are supported on a carrier made of boron, and the other ends are connected by an other bonding part in which uranium and thorium are supported on a carrier made of carbon. The one-end side bonding part is raised to a first temperature through α-decay of uranium (U) and thorium (Th), and the other bonding part is raised to a second temperature that is different from the first temperature through α-decay of uranium (U) and thorium (Th), whereby a current is generated by the Seebeck effect based on the relative temperature difference between the two bonding parts. Voltage power source device and power generation method enable next-generation type energy supply.

8 Claims, 5 Drawing Sheets

(56) References Cited

OTHER PUBLICATIONS

International Search Report dated Mar. 28, 2023, issued in corresponding International Patent Application No. PCT/JP2023/002542.
Written Opinion dated Mar. 28, 2023, issued in corresponding International Patent Application No. PCT/JP2023/002542.

* cited by examiner

POWER SOURCE DEVICE AND POWER GENERATION METHOD UTILIZING RADIOACTIVE ENERGY DUE TO ALPHA DECAY

TECHNICAL FIELD

The present invention relates to a type of power source device that enables next-generation type energy supply, which is completely different from the conventional form of energy supply as so-called large-scale infrastructure facilities or the form of modular type energy supply using so-called small combustion systems that have been considered for widespread use in recent years, and to a power generation method using the same.

BACKGROUND ART

Figure 1:
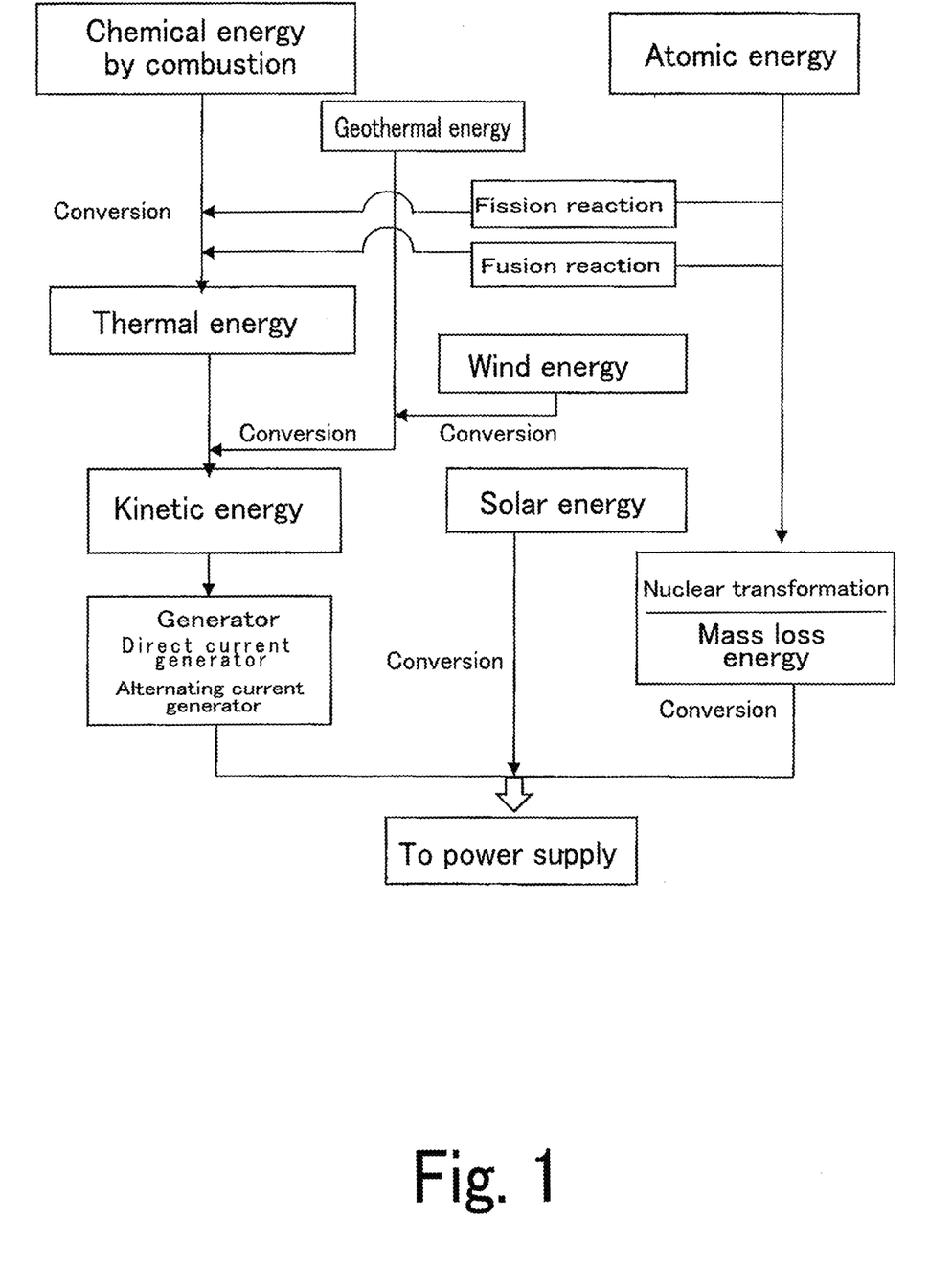
FIG. 1 is a schematic drawing showing the mechanism of power supply of the conventional technology and including the scope of the present invention systematically.

FIG. 1 is a schematic drawing systematically showing the mechanism of supplying electric power, including the conventional technology and the scope of the present invention. The contents of the conventional technology included in and forming part of this schematic drawing will be explained. As can be seen from this FIG. 1, the energy required to generate electricity can be obtained by converting various types of energy obtained from the natural world into rotational energy.

In energy obtained in the natural world, a method in which it is once converted into thermal energy and utilized, and a method in which kinetic energy is obtained by converting thermal energy obtained in the natural world and thermal energy such as oil and coal are generally exploited and utilized.

On the other hand, there is known a power source module having a modular form of energy supply using a so-called small-sized combustion system, which has been considered for widespread use in recent years (for example, see Patent document 1).

PRIOR ART DOCUMENT

Patent Document

Patent document 1: JP 2010-135183A

SUMMARY OF THE INVENTION

Problems to be Solved by the Invention

Among the power generation systems mentioned above, for example, the most common at present is a system in which electric power generated at nuclear power plants, thermal power plants, and hydroelectric power plants located far from urban areas is supplied to urban areas via transmission lines. However, in such large-scale infrastructure facilities, if one part of the system once malfunctions due to a major earthquake or abnormal weather conditions such as arrival of a huge typhoon, or an act of terrorism, the entire infrastructure of the electric power supply system ceases to function, resulting in a serious situation.

In addition, power generation using natural energy sources such as solar power generation, wind power generation, tidal power generation, and geothermal power generation alone is not sufficient to generate the amount of power actually needed, and moreover, as mentioned above, electric power must be supplied from the location where it was generated to urban areas through power lines, and if some problem occurs in this process, the electric power supply will be stopped and it will take time to restore it.

On the other hand, the above-mentioned modular distributed power generation system is being used to prepare for such large-scale electric power supply disruptions, but such modular power generation units usually require combustion of fuel to generate a large amount of thermal energy, which is then converted to rotational energy and extracted as electric power, so that this goes against the important social issue of reducing global warming in recent years. Therefore, the development of an epoch-making power source device that does not have the above-mentioned disadvantages of each power generation system is an urgent issue to be solved.

An object of the present invention is to provide a type of power source device that enables next-generation type energy supply, which is completely different from the conventional form of energy supply as so-called large-scale infrastructure facilities or the form of modular type energy supply using so-called small combustion systems that have been considered for widespread use in recent years, and to a power generation method using the same.

Means to Solve the Problem

In order to solve the above-mentioned problem, a power source device utilizing radioactive energy due to α-decay according to claim 1 of the present invention comprises, a connected structure in which each one of ends of a first metal and a second metal each comprising a structure having one-end and the other end and comprising different kinds suitable for generating Seebeck effect is connected in a conductive state through a one-end bonding part in which uranium (U) and thorium (Th) are supported on a carrier made of boron (B), and the other end side bonding part is connected in a conductive state through a bonding part at the other end in which uranium (U) and thorium (Th) are supported on a carrier made of carbon (C), the one-end side bonding part in which uranium (U) and thorium (Th) are supported on a carrier made of boron (B) is formed so that it is generated heat by α-decay of uranium (U) and thorium (Th) to raise the temperature to a first temperature, the other end side bonding part in which uranium (U) and thorium (Th) are supported on a carrier made of carbon (C) is formed so that it is generated heat by α-decay of uranium (U) and thorium (Th) to raise the temperature to a second temperature which is different from the first temperature, the first metal is provided with a first output terminal part, the second metal is provided with a second output terminal part which is different from the first output terminal part, and a structure capable of outputting a current generated by the Seebeck effect based on a relative temperature difference through the one-end side bonding part that has risen to the first temperature and the other end side bonding part that has risen to the second temperature as an atomic induced voltage power source device through the first output terminal part and the second output terminal part.

Also, the power generation method utilizing radioactive energy due to α-decay according to claim 2 of the present invention comprises preparing a first metal and a second metal, each having a form of one-end and the other end, and comprising different kinds suitable for generating a Seebeck effect, connecting each one of ends of the first metal and the second metal in a conductive state through a one-end bonding part in which uranium (U) and thorium (Th) are supported on a carrier made of boron (B), and connecting the other end side bonding part in a conductive state through a bonding part at the other end in which uranium (U) and thorium (Th) are supported on a carrier made of carbon (C), generating heat at the one-end side bonding part in which uranium (U) and thorium (Th) are supported on a carrier made of boron (B) by α-decay of uranium (U) and thorium (Th) to raise to a first temperature, generating heat at the other end side bonding part in which uranium (U) and thorium (Th) are supported on a carrier made of carbon (C) by α-decay of uranium (U) and thorium (Th) to raise to a second temperature which is different from the first temperature, conductively connecting a first output terminal part to the first metal, and conductively connecting a second output terminal part to the second metal, and utilizing, as a power source, a current generated by the Seebeck effect based on a relative temperature difference through the one-end side bonding part that has risen to the first temperature and the other end side bonding part that has risen to the second temperature through a second output terminal part which is different from the first output terminal part conductively connected to the first metal and the first output terminal part conductively connected to the second metal.

Also, the power source device utilizing radioactive energy due to α-decay according to claim 3 of the present invention comprises, in the power generation method utilizing radioactive energy due to α-decay according to claim 1, the uranium (U) comprising a naturally radioactive element with a mass number 238, which is the nuclide of its isotope, and the thorium (Th) comprising a naturally radioactive element with a mass number 232.

Also, the power generation method utilizing radioactive energy due to α-decay according to claim 4 of the present invention comprises, in the power generation method utilizing radioactive energy due to α-decay according to claim 2, the uranium (U) comprising a naturally radioactive element with a mass number 238, which is the nuclide of its isotope, and the thorium (Th) comprising a naturally radioactive element with a mass number 232.

Also, the power source device utilizing radioactive energy due to α-decay according to claim 5 of the present invention comprises, providing a plurality of the power source devices utilizing radioactive energy due to α-decay according to claim 1 or claim 3, and providing an output terminal part capable of collectively supplying power generated by the plurality of the power source devices, which utilize radioactive energy due to α-decay by arranging the first output terminal parts and the second output terminal parts of each power source devices utilizing radioactive energy due to α-decay in series connection or parallel connection, to the outside as a power source power generation unit utilizing radioactive energy due to α-decay or a power generation device utilizing radioactive energy due to α-decay.

Also, the power generation method utilizing radioactive energy due to α-decay according to claim 6 of the present invention comprises, in carrying out the power generation method utilizing radioactive energy due to α-decay according to claim 2 or claim 4, collectively supplying power generated by the plurality of the power source devices utilizing radioactive energy due to α-decay by arranging the first output terminal part and the second output terminal part of each power generation method utilizing radioactive energy due to α-decay in series connection or parallel connection, to the outside.

Effects of the Invention

According to the present invention, it can provide a power source device utilizing radioactive energy due to α-decay and a power generation method, which are a type of power source device and a power generation method using the same, that enable next-generation type energy supply which is completely different from the conventional form of energy supply as so-called large-scale infrastructure facilities or the form of modular type energy supply using so-called small combustion systems that have been considered for widespread utilization in recent years.

EMBODIMENTS TO CARRY OUT THE INVENTION

Hereinafter, the power source device utilizing radioactive energy due to α-decay and power generation method according to one embodiment of the present invention will be explained based on the drawing. Incidentally, the present embodiment is to merely show an example of the present invention, and the present invention is not limited to this embodiment. That is, it is possible to appropriately change the shape, dimensions, material and number of each constitutional element as long as the range in which the action of the present invention can be demonstrated.

Figure 2:
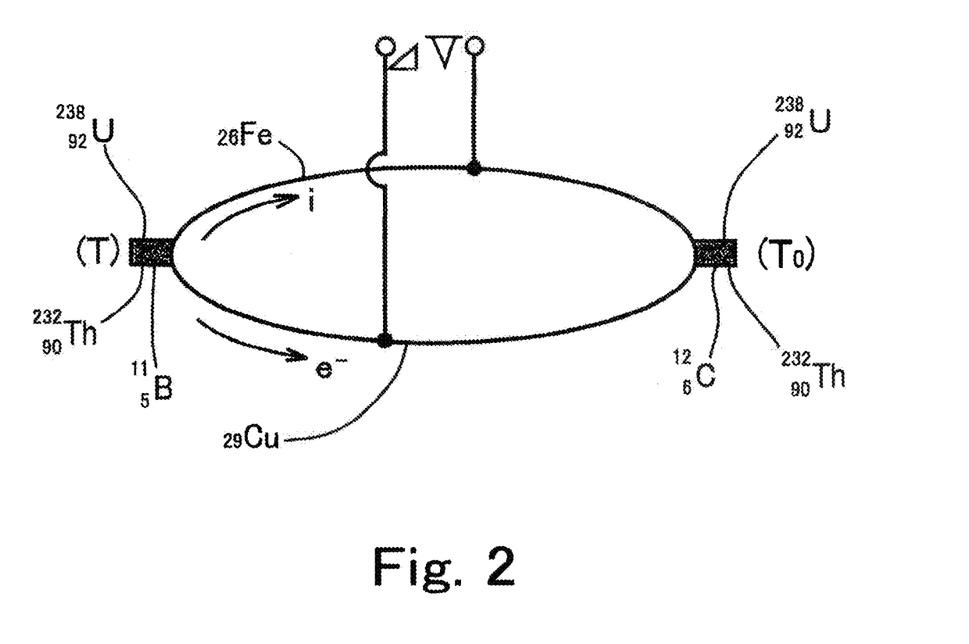
FIG. 2 is an explanation drawing which becomes a principle necessary for implementing the power source device utilizing radioactive energy due to α-decay and power generation method according to the present invention, and is a drawing explaining a flow of electric current and a flow of electrons in the closed circuit constituting the present invention.

FIG. 2 is an explanation drawing which becomes a principle necessary for implementing the power source device utilizing radioactive energy due to α-decay and power generation method according to the present invention, and is a drawing explaining a flow of electric current and a flow of electrons in the closed circuit constituting the present invention.

The power source device utilizing radioactive energy due to α-decay according to one embodiment of the present invention has a form of a metal panel, and provided with copper (Cu) which is a first metal and iron (Fe) which is a second metal member, which can sufficiently withstand heat generation accompanied by conduction of electric for a long period of time as well as can sufficiently withstand mechanical deformation. Instead of the form of a metal panel, it may be in the form of an electric wire in the form of a so-called known metal strand, dimensioned as an appropriate thickness taking into account the resistance value of each metal.

And, each of one-end (the left side end in FIG. 2) of the first metal member and the second metal member is in a connected structure in a conductive state connected through a one-end bonding part in which uranium (U) and thorium (Th) are supported on a carrier made of boron (B). Incidentally, the one-end side bonding part in which uranium (U) and thorium (Th) are supported on a carrier made of boron (B) is formed so that it is raised to the first temperature by generating heat due to α-decay of uranium (U) and thorium (Th).

Also, each of the other end (the right side end in FIG. 2) of the first metal member and the second metal member is in a connected structure in a conductive state connected through the other bonding part in which uranium (U) and thorium (Th) are supported on a carrier made of carbon (C).

Incidentally, the other bonding part in which uranium (U) and thorium (Th) are supported on a carrier made of carbon (C) is formed so that it is raised to the second temperature by heat generation due to α-decay of uranium (U) and thorium (Th), which is different from the first temperature raised at the one-end bonding part.

And, by conducting the one-end side bonding part and the other end side bonding part in this way, thus forming an electrical closed circuit, which is a characteristic structure not found elsewhere that forms an important part of the present invention.

Also, at a predetermined portion of the first metal member made of copper (Cu), as shown in FIG. 2, a first output terminal part electrically conduced to the metal member is provided.

Further, at a predetermined portion of the second metal member made of iron (Fe), as shown in FIG. 2, a second output terminal part electrically conduced to the metal member is provided.

As can be seen from the content shown in FIG. 2, by generating the temperature difference between the first temperature at which the one-end side bonding part rises and the second temperature at which the other end side bonding part rises, in the closed circuit of copper (Cu) which is the first metal member and iron (Fe) which is the second metal member, which consist of different types suitable for generating the Seebeck effect, the current is generated in the clockwise direction (flow of electron in the counterclockwise direction) in FIG. 2.

Thus, based on the relative temperature difference between the one-end side bonding parts of the first metal member and the second metal member the temperatures of which are raised to the first temperature, and the other end side bonding parts of the first metal member and the second metal member the temperatures of which are raised to the second temperature, the current generated in the closed circuit formed by the first metal member and the second metal member by the Seebeck effect is electrically extracted through the first output terminal portion and the second output terminal portion to be exploited as a power supply.

Incidentally, the combination of the first metal member and the second metal member that generates the Seebeck effect necessary in the present invention is not limited to the above-mentioned copper (Cu) and iron (Fe), and the following combinations are also included in the scope of the present invention. Specifically, a combination of 1 and 2 in the number of nuclear electrons is desirable based on the nuclear electron configuration of the neutral atoms. For example, there may be considered various combinations such as $_{47}$Ag (silver) and $_{40}$Zr (zirconium) or $_{47}$Ag (silver) and $_{26}$Fe (iron); and the like. However, the inventor considers that the combination of $_{29}$Cu (copper) and $_{26}$Fe (iron) is the most excellent in the point of cost and the most suitable because of its abundance in the earth.

Subsequently, more specific configuration of the power source device utilizing radioactive energy due to α-decay (an atomic induced voltage power source device) according to the present invention is explained below. In the present embodiment, in order to generate the Seebeck effect mentioned above, the one-end side bonding part is a high-temperature contact that generates heat up to a high temperature, and the other end side bonding part is a low-temperature contact that generates heat above normal temperature but not so high as the high temperature of the high-temperature contact. Specific configurations of the high-temperature contact and the low-temperature contact are as follows.

The high-temperature contact has a form of a panel state in which, on a support made of boron (B) with an atomic number 5 and a mass number 11, a nuclide with a mass number 238, which has the longest half-life (lifetime) among isotopes of uranium (U) with an atomic number 92 and is the most abundant in the natural world at a ratio of 99.2742% is supported, and a nuclide with a mass number 232, which is present in the natural world at a ratio of substantially 100% of the isotopes of thorium (Th) with an atomic number 90 is also supported.

On the other hand, the low-temperature contact has a form of a panel state in which, on a support made of carbon (C) with an atomic number 6 and a mass number 12, a nuclide with a mass number 238, which has the longest half-life (lifetime) among isotopes of uranium (U) with an atomic number 92 and is the most abundant in the natural world at a ratio of 99.2742% is supported, and a nuclide with a mass number 232, which is present in the natural world at a ratio of substantially 100% of the isotopes of thorium (Th) with an atomic number 90 is also supported.

And, one-end side of each of iron (Fe) with an atomic number 26 and copper (Cu) with an atomic number 29 is used as one of the connection parts, and a high-temperature contact comprising the configuration mentioned above is arranged to the one-end side connection part which is one of the connection parts, the other connection part is made the other end side connection part comprising the above-mentioned configuration, and the low-temperature contact is arranged to the other end side connection part in which the other is the connection part, whereby the closed circuit as shown in FIG. 2 is formed.

And, by utilizing the phenomenon that the temperature is higher than normal temperature but temperature rise is relatively different that occurs in each of the high-temperature contact and the low-temperature contact shown in FIG. 2, in the one-end side connection part and the closed circuit of FIG. 2, the flow of current is generated in the clockwise direction, that is, the flow of electron around the counter-clockwise direction by the Seebeck effect. The findings of the inventor who came up with this revolutionary configuration are as follows.

(1) Electrons (e−) flow from iron (Fe) to copper (Cu). (2) Also, the number of electrons (e−) is greater at the high-temperature contact than at the low-temperature contact. (3) Further, in a thin film panel conductor of iron (Fe), the part of the high temperature (T) becomes a "higher potential" than the part of the low temperature (To), and the current (I) flows in the direction from the high-temperature contact to the low-temperature contact.

By utilizing the Seebeck effect based on the above (1) to (3), an atomic induced voltage ΔV=(Seebeck coefficient)×(T−To) between both contacts is generated.

Thus, as the origin of the present invention, it is characterized in that the radioactive energy due to the so-called "α-decay" of a naturally radioactive element generated at one contact point and the other contact point is semi-permanently converted into thermal energy at each contact point in the present invention, an atomic number 92, uranium (U: uranium) with a mass number 238 and an atomic number 90, thorium (Th: thorium) with a mass number 232 are supported on the carrier made of boron (B) and an atomic number 92, uranium (U: uranium) with a mass number 238 and an atomic number 90 thorium (Th: thorium) with a mass number 232 are supported on the carrier made of carbon (C) respectively. Incidentally, the meaning of "semi-permanent" here is based on the fact that the half-life of 238U is approximately 4.5 billion years.

In other words, this is based on the revolutionary principle discovered by the inventor that, by utilizing the difference in the amount of heat generated at each of these contacts based on the above-mentioned difference in the type of the carrier, iron (Fe) is used as one conductor among the two conductors suitable for generating the so-called Seebeck effect, that is electrically conductive only at one conductor coupling part and the other conductor coupling part that form one contact point and is electrically insulated from each other otherwise, and copper (Cu) is used as the other conductor to efficiently and semi-permanently generate a thermoelectromotive force.

That is, there is remarkable technical meaning in that, by utilizing and exploiting the above-mentioned principle and as the thermal energy necessary for "thermoelectric generation," for example, 238U, which has a half-life of approximately 4.5 billion years and is semi-permanent, and 232Th, which also has a half-life of approximately 14 billion years and is semi-permanent, are used, as well as the above-mentioned natural radioactive substances are caried on boron (B) and carbon (C) which are carriers thereof in the form of panels, which are carriers of these materials, the inventor of the present invention conceived an atomically induced voltage power generation device (power source module, power generation unit, or power generation device), which is far superior to nuclear power generation and fuel-burning power type generation systems, which have to be large-scale facilities, and hydroelectric, wind power generation, solar power generation, tidal power generation, and geothermal power generation, etc., which are also large-scale facilities that cannot provide a stable supply of electricity in sufficient quantities due to natural conditions such as weather.

Incidentally, as mentioned above, iron (Fe) was used as one conductor and copper (Cu) was used as the other conductor, and the reason is that their respective electrical resistance values (Ωm) are $9.71 \times 10^{-8}$ Ωm in the case of iron (Fe) and $1.71 \times 10^{-8}$ Ωm in the case of copper (Cu), which makes them best form of extremely efficient power generation devices (power source modules, power generation units, and power generation devices) that utilize the Seebeck effect.

However, it goes without saying that if the Seebeck effect can be utilized to generate electricity equivalent to that mentioned above, conductors of different types from these conductors but of equivalent materials in terms of the effects of the invention can be used.

Here, the amount of heat generated at one-end side connection part, which is one contact point, and the amount of heat generated at the other end side connection part, which is the other contact point are explained. First, the amount of heat generated at the one-end side connection part, which is one contact point, is mentioned.

[Formula 1]

Boron element (5B) causes exothermic reaction generating mass loss ΔE in nuclear transformation reaction.

Exothermic reaction

Note) Temperature (T) 1eV:$1,160 \times 10^4 (K)$

Subsequently, the amount of heat generated at the other end side connection part, which is the other contact point, is mentioned.

[Formula 2]

Carbon (6C) causes endothermic reaction generating mass loss ΔE in nuclear-nuclear transformation reaction.

Endothermic reaction

And, as mentioned above, as a guide for the preferred mass and content of each constitutional element of the atomically induced voltage power generation device according to the present invention, the following contents may be considered. Specifically, in constituting the high temperature heating contact and the low temperature heating contact, it can be considered those containing a total of four kinds of atoms (in the high temperature heating contact, it comprises two kinds of naturally radioactive elements+one kind of atom that serves as a carrier for these elements, and in the low temperature heating contact, the same two kinds of naturally radioactive elements as in the high temperature heating contact+one kind of atom that serves as a carrier for these elements, that is different from that of the high temperature heating contact), and a panel having various forms such as powder or fine powder or ultrafine powder is mixed, a thin film sheet, a paper sheet, and a panel containing a radioactive element which is a coating material, etc.

Incidentally, more preferably, in the heating panel of the high-temperature contact side, that is, the heating panel comprising a carrier of the boron atom (B) with an atomic number 5 and a mass number 11 on which radioactive elements of $^{238}$U with an atomic number 92 and $^{232}$Th with an atomic number 90 are supported, the respective amounts are preferably within the following ranges.

| | |
|---|---|
| Uranium ($^{238}$U) | 1000 ppm to 1 g |
| Thorium ($^{232}$Th) | 1000 ppm to 1 g |
| Boron (B) | 500 ppm to 10 g |

Also, in the heating panel of the low-temperature contact side, that is, the heating panel comprising a carrier of the carbon atom (C) with an atomic number 6 on which radioactive elements of the uranium atom (U: uranium) with an atomic number 92 and a mass number 238 and the thorium atom (Th) with an atomic number 90 and a mass number 232 are supported, the respective amounts are preferably within the following ranges.

| | |
|---|---|
| Uranium ($^{238}$U) | 1000 ppm to 1 g |
| Thorium ($^{232}$Th) | 1000 ppm to 1 g |
| Carbon (C) | 500 ppm to 10 g |

That is, in the present embodiment, an example of a preferable combination of substances is as follows. Specifically, as radioactive elements of radioactive energy source due to "α-decay," two atoms of uranium (U) with an atomic number 92 and thorium (Th) with an atomic number 90 are used, and more specifically, for uranium (U), a nuclide with a mass number 238, which has the highest existence ratio as an isotope in natural world and is inexpensive and easily available, is used, and for thorium (Th), a nuclide with a mass number 232, which has substantially 100% abundance as an isotope, is used.

Also, as a carrier for supporting atoms to be exploited and utilized when thermal energy is converted into electrical energy, that is, the above-mentioned uranium (U) and thorium (Th), as the substance to be used for the high temperature heating contact side, boron (B) with an atomic number 5 is used, and as the substance to be used for the low temperature heating contact side, carbon (C) with an atomic number 6 is used and these four atoms are exploited.

More preferably, the amount of radioactive elements to be included in the device is preferably in the form that it is included in the power generator in the state of having the content of around 10 Kg per a device.

In the following, the scientific and technical contents that are the basis for the inventor of the present invention to conceive the above-mentioned excellent invention will be explained. First, to conduct exploitation and utilization of radioactive elements due to α-decay how much radioactive energy is greatly generated compared with, for example, β rays (β particles) and cosmic rays.

(i) The maximum energies of α particles and β particles are as follows.
α-Ray . . . 1.83 to 11.7 MeV
β-Ray . . . 0.2 to 8 MeV
(ii) Incidentally, the maximum energy of cosmic rays is >50 MeV.

According to this, it can understand how the atomically induced power generation devices (power source modules, power generation units or power generation devices) according to the present invention can efficiently generate energy even though it is extremely small.

In addition to the above, by irradiating to the contact of the closed circuit prepared by connecting thin film panels of the two kinds of metals of iron (Fe) and copper (Cu) explained in the above-mentioned embodiment by the inventor of the present invention, and by exploiting and utilizing the "thermoelectric effect" to achieve generation of an "atomic induced voltage," whereby energy is efficiently generated and supplied.

FIG. 1 is a drawing explained in the above-mentioned background art and problems to be solved, and is a schematic drawing systematically showing the mechanism of power supply including the conventional technology and the scope of the present invention. And, as the positioning of the present invention, based on the nuclear energy shown in the upper right of the drawing, it is positioned that the mass loss due to nuclear transmutation shown in the lower right is extracted as energy and connected to the power supply shown in the bottom side of the drawing.

That is, it has epoch-making technical significance in that it has avoided all the drawbacks explained in this drawing, background art as the conventional examples and problems to be solved, and has discovered (conceived) a power generation device and a power generation method for converting thermal energy into electric energy by utilizing the characteristics and properties of substances composed of specific elements without being affected by the natural world.

As the positioning of the present invention, based on the nuclear energy shown in the upper right of the drawing, it is positioned that the mass loss due to nuclear transmutation shown in the lower right is extracted as energy and connected to the power supply shown in the bottom side of the drawing. That is, it has epoch-making technical significance in that it has avoided all the drawbacks explained in this drawing, background art as the conventional examples and problems to be solved, and has discovered (conceived) a power generation device and a power generation method for converting thermal energy into electric energy by utilizing the characteristics and properties of substances composed of specific elements without being affected by the natural world.

In other words, in conventional power generation systems for generating and supplying energy, it is essential to convert various energies obtained from the natural world into rotational energy, and in order to convert this various energies from the natural world into rotational energy, it is necessary to rely on extremely large scale power generation equipment, whereby the manufacturing cost of the power generation equipment itself becomes enormous.

Also, with regard to wind power generation, hydroelectric power generation, solar power generation, geothermal power generation, tidal power generation, etc., installation locations are limited in order to use natural energy efficiently, and because they are extremely large scale power generation facilities, they must be installed in areas far from urban and rural density populated areas and industrial zones, and a large-scale transmission facility must be installed to transmit power to these urban and rural density populated areas and industrial zones, which is a large and costly installation.

Also, for the facilities with regard to the nuclear power generation, the cooling system for the fuel control rods is large-scale and must be located adjacent to the coast due to its large scale, and for Japan located in the boundary region between the Eurasian plate, the Pacific plate, the Philippine Sea plate and the North American plate, there always involve serious and critical problems that the sudden inoperability of the cooling system due to a huge earthquake that cannot expect at any time it will happen and subsequent tsunami, the resulting inability to control the combustion of nuclear fuel by the fuel control rods, and the loss of maintenance of critical state of the uranium (U) 235. This danger is considered to be caused not only by tsunamis caused by earthquakes, but may also be caused by unexpected and accidental events such as acts of terrorism, regional conflicts, and wars as conflicts between nations due to recent changes in the international situation in recent years.

Further, in such nuclear power generation, it is accompanied by extremely important problems, while it is secondary, such as obtaining uranium (U) 235 as nuclear fuel from overseas and disposing of nuclear waste. On the other hand, as a locally distributed power generation system, it is becoming popular to install photovoltaic panels on the roofs of houses to achieve a certain degree of self-sufficiency in each houses, but as mentioned above, the power generation effect depends on the natural environment, such as good sunlight conditions due to sunlight, and in addition, the cost of installing such solar panels on the roofs of private residences to maintain good power generation state is quite high, and the solar panels are constantly threatened to be damaged and rendered ineffective as power generation device due to arrival of giant typhoons, torrential rains caused by linear precipitation zones, and sudden tornadoes that have accompanied abnormal weather in recent years have caused damage to the solar panels that were installed at great cost and may render them useless as power generation devices.

Also, as one of the similar local distributed power generation systems, a module-type small power generation device by gas fuel combustion is known, but even though it is small, it is reasonably large and cannot be easily installed in residential areas, commercial buildings, factories, etc. at a low price.

In addition to the above, maintenance costs are quite high, and as mentioned above, it must always be subject to the unforeseeable and unexpected risk that it may suddenly become difficult to obtain gas fuel, which must be constantly procured for power generation, due to changes in the international situation, etc., or the cost of obtaining gas fuel may rise sharply, so that it may not be possible to obtain the amount of electricity needed to meet the cost of fuel even if the fuel device is operated.

However, according to the revolutionary power generation device and power generation method according to the present invention, it is possible to solve the various problems as described above all at once. In other words, by the implementation of the present invention, the dawn of a new era of energy can be ushered in. Specifically, it will enter an era in which the characteristics and properties of substances (various atoms) are exploited and utilized to generate "atomically induced power generation" of direct current, and a method and device for supplying electric power can be used.

EXAMPLES

Subsequently, based on the basic concept of the invention and its basic configuration explained above, an example showing an example of specific schematic dimensions in which the power source device utilizing radioactive energy due to α-decay according to the present invention can be realized as a single power generation device or, for example, as a power generation unit by stacking the devices, will be explained.

Through this example, it can be understood that the power generation device utilizing radioactive energy due to α-decay according to the present invention is completely different from conventional devices, that is, it is possible to realize a very small power generation device that could not exist in the past, for example, a laptop computer, a handbag, or even the size of a lunch box, which people use on a daily basis.

Figure 3:
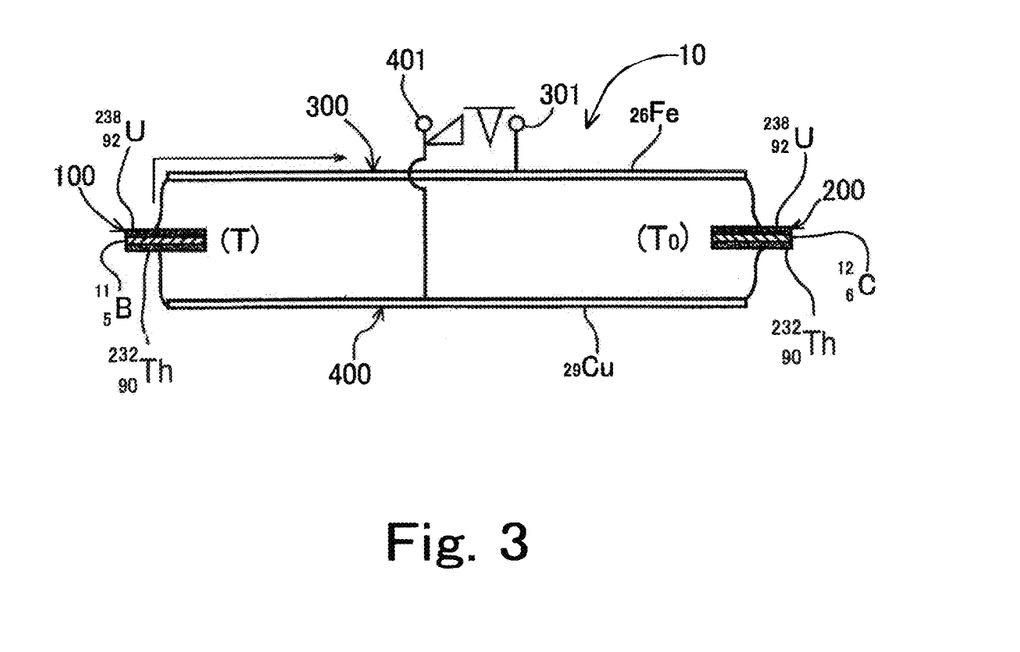
FIG. 3 is a schematic configuration drawing as an example of the implementation of the power source device and power generation method utilizing radioactive energy due to α-decay according to the present invention.
Figure 4:
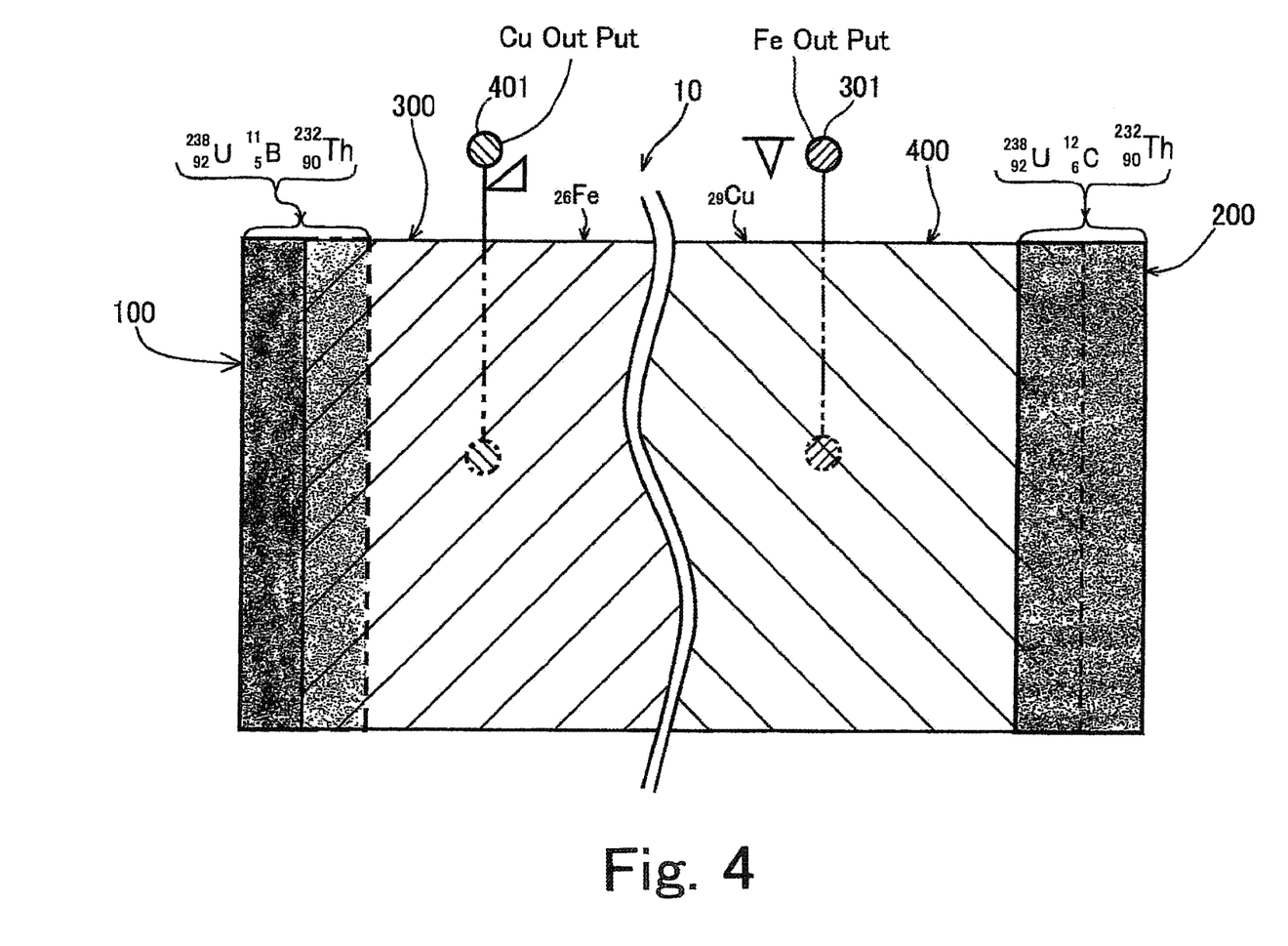
FIG. 4 is a plan view of the modular type example shown in side view in FIG. 3, with the left half of the plan view shown along the upper side surface of the iron-filled conductor panel located above the high temperature heat generation side contact in FIG. 3, and the right half of the plan view shown along the upper surface side of the low temperature heat generation side contact.

Specifically, a module comprising the shape and dimensions shown in FIG. 3 and FIG. 4 is now used in the present invention. FIG. 3 and FIG. 4 are schematic configuration drawings as an example of the implementation of the power source device and power generation method utilizing radioactive energy due to α-decay according to the present invention. More specifically, FIG. 3 is a schematic configuration drawing showing a side view along its longitudinal direction of an example of a module that forms the smallest unit of the "atomically induced power generation type power source device," which the inventor of the present invention named as an unprecedented and innovative power generation device never seen before. Also, FIG. 4 is a plan view of the modular type example shown in side view in FIG. 3, with the left half of the plan view shown along the upper side surface of the iron-filled conductor panel located above the high temperature heat generation side contact in FIG. 3, and the right half of the plan view shown along the upper surface side of the low temperature heat generation side contact.

This atomically induced power generation type power source device 10 (hereinafter it is simply referred to "power source module 10") comprises a high temperature side heating contact 100, a low temperature side heating contact 200, one conductor 300 that generates the Seebeck effect, and the other conductor 400 that is made of a different metal than one conductor 300, each of which is a panel shape with a thin thickness. Also, at the one conductor 300, one output terminal part 301 is provided, and at the other conductor 400, the other output terminal part 401 is provided. And, the dimensions of the entire power source module 10 and each of the elements that make up thereof in the present example are as follows.

The overall size of the power source module is 40 cm in length and 20 cm in width, and for its thickness, it is extremely thin thickness, almost equal to the sum of the thicknesses of each of the elements explained below.

The one conductor 300 comprises a rectangular thin sheet panel made of iron (Fe) having dimensions of 30 cm in length, 20 cm in width and 1 mm in thickness. Also, the other conductor 400 also comprises a rectangular thin sheet panel made of copper (Cu) having the same dimensions as the one conductor panel of 30 cm in length, 20 cm in width and 1 mm in thickness. Incidentally, in FIG. 5, the longitudinal directions of these one conductor panel and the other conductor panel conforms to the left-right direction in the drawing, and the width direction conforms to the direction perpendicular to the paper that forms the drawing.

Also, the high temperature side heating contact 100 has a thin sheet panel shape having external form dimensions of 20 cm in length, 5 cm in width and 1 mm in thickness, and a nuclide with a mass number 238 among the isotopes of uranium (U) with an atomic number of 92 and a nuclide with a mass number 232 among the isotopes of thorium (Th) with an atomic number 90 mentioned above are supported on boron (B) as a carrier.

And, the high temperature heat generation side contact 100 is electrically connected at one-end sides (left side in FIG. 3 and FIG. 4) of the one conductor panel 300 and the other conductor panel 400, and the low temperature heat generation side contact 200 is electrically connected at the other end sides (right side in FIG. 3 and FIG. 4) of the one conductor panel 300 and the other conductor panel 400.

Also, with regard to the low temperature heat generation side contact 200, it has a thin sheet panel shape and the same dimensions as the high temperature heat generation side contact 100, that is, external form dimensions of 20 cm in length, 5 cm in width, and 1 mm in thickness, and as in the high temperature heat generation side contact 100, a nuclide with a mass number 238 among the isotopes of uranium (U) with an atomic number of 92 and a nuclide with a mass number 232 among the isotopes of thorium (Th) with an atomic number 90 mentioned above are supported on carbon (C) as a carrier.

Incidentally, in FIG. 3 and FIG. 4, the longitudinal direction of both of these high temperature heat generation side contact and the low temperature heat generation side contact conforms to the direction perpendicular to the paper surface that forms the drawing, and the width direction conforms to the left-right direction on the drawing.

As can be seen from the above explanation, the one conductor panel 300 and the other conductor panel 400, and the high temperature heat generation side contact 100 and the low temperature heat generation side contact 200 are orthogonal to each other in their longitudinal directions. And, as can be seen from FIG. 3 and FIG. 4, the respective width directions of the high temperature side heating contact 300 and the low temperature side heating contact 400 are in the form of extending further along the longitudinal direction of these panels from both ends of one and the other conductor panel, and the length of the longitudinal direction of the module which is combined these is 40 cm.

Incidentally, a power generated by a plurality of the power source devices utilizing radioactive energy due to α-decay provided with a plurality of the power source devices utilizing radioactive energy due to α-decay according to the above-mentioned example and one output terminal part 301 and the other output terminal part 401 of each power generation device utilizing radioactive energy due to α-decay by series connection or parallel connection may be supplied to the outside collectively as a power source power generation device utilizing radioactive energy due to α-decay or a power generation device utilizing radioactive energy due to α-decay. That is, the size of the atomically induced power generation type power generation device according to the present invention can be determined by appropriately selecting one of the following several types of forms depending on the amount of power generated.

Figure 5:
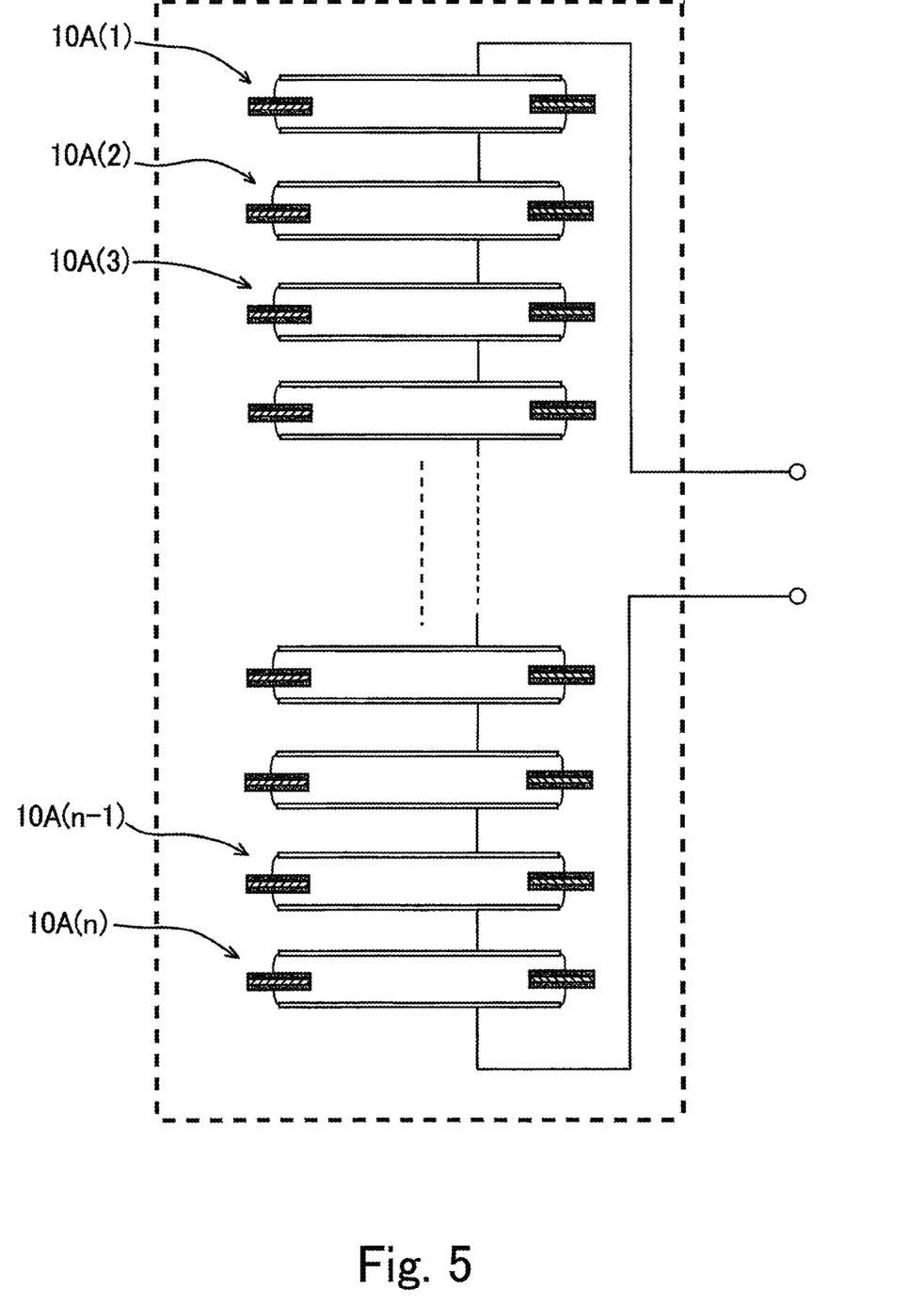
FIG. 5 is an explanation drawing schematically showing an applied modification example in the form of a power generation unit or power generation device by connecting the power source modules according to the above-mentioned example in series with each other.
Figure 6:
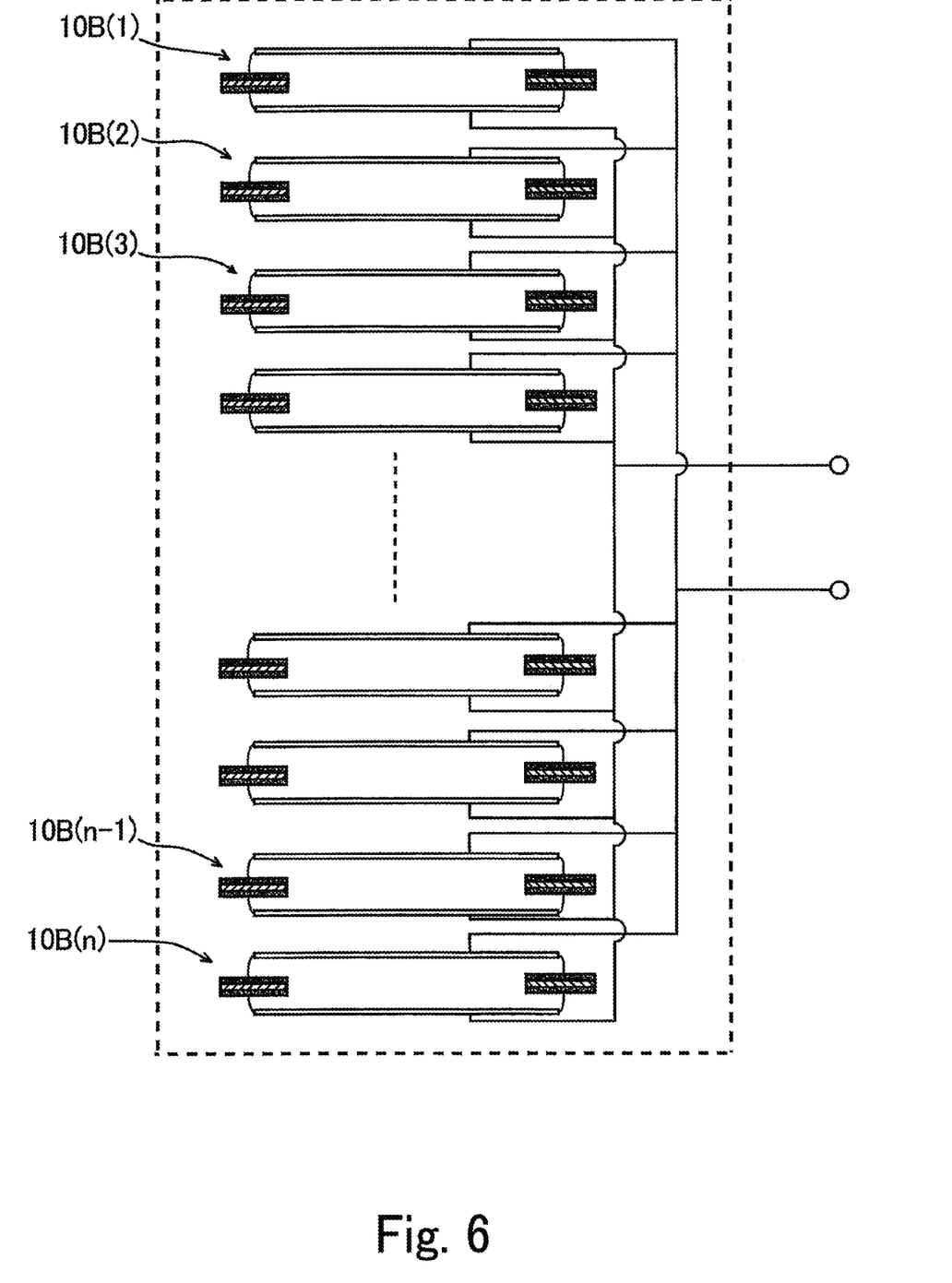
FIG. 6 is an explanation drawing schematically showing an applied modification example in the form of a power generation unit or power generation device by connecting the power source modules according to the above-mentioned example in parallel with each other.

The basic idea of the configuration of the power generation units and the power generation devices mentioned above is explained on the basis of the drawings. FIG. 5 and FIG. 6 are explanation drawings schematically showing this several types of configurations suitable for the actual form of use of the present invention. That is, FIG. 5 is an explanation drawing schematically showing an applied modification example in which the power source modules 10A(1), 10A(2), 10A(3), ... 10A(n−1), 10A(n) (n is a natural number of two or more) according to the above-mentioned example are connected in series with each other to form a power generation unit or a power generation device. Also, FIG. 6 is an explanation drawing schematically showing an applied modification example in which the power source modules 10B(1), 10B(2), 10B(3), 10B(n−1), 10B(n) (n is a natural number of two or more) according to the above-mentioned example are connected in parallel to each other to form a power generation unit or a power generation device.

In other words, the most compact type is a module type, which is in the form of a module assembly (thin film panel assembly) made by laminating an appropriate number of thin film panels as shown in FIG. 2 mentioned above. And, a type with a larger power generation capacity comprises this module assembly and the module assembly can be realized as a type in which the number of the modules of n are electrically connected in series (see FIG. 5), or a type in which similarly the number of the modules of n are connected in parallel, or it can be implemented as a configuration of a combination of these.

That is, in the case of the form of the series module connection shown in FIG. 4, depending on the number of modules, for example, the output voltage can be changed according to the number of modules from 1 x module stand-alone output voltage (V) when there is one module to n x module stand-alone output voltage (V) when there are n modules. Incidentally, in the case of series module connection, the output current is constant as module stand-alone output current (A) regardless of the number of modules.

On the other hand, in the case of the form of the parallel module connection shown in FIG. 5, when the modules are combined from one to n depending on the number of modules, the output voltage is constant as x module stand-alone output voltage (V), but the output current is n×I (A).

As a device for even greater amounts of power generation, a power generation device in the form of a unit assembly comprising the above-mentioned module assembly further connected in series or in parallel or a combination of these is conceivable. In other words, the atomically induced power generation device according to the present invention can be used in various combinations to provide a tailor-made power source device tailored to TPO in a timely manner.

Specifically, if it is a module-type power source device with a small size and small power generation capacity, for example, if the output is one volt in the configuration shown in FIG. 3, by connecting five of these in series, it can continue to be used as an independent power source for emergency lights, cell phones, interception equipment for disaster prevention wireless communication, computers, TVs, radios, etc., without worrying about power source consumption of regular batteries, etc. In addition, if it is a unit type that is larger than this and is a unit type having an output of about 100 volts, it can continue to be used semi-permanently as an independent power source device for power consumption in a single home, or installed at charging stations for electric vehicles, electric motorcycles, battery-assisted bicycles, etc., and used semi-permanently.

Further, if it is a device type of a larger scale and a device type having an output of about 1,000 volts, it can be stepped down and supplied semi-permanently as an independent electric power in the surrounding area where this power source is installed. Also, if the power source is of this size of the device type, it can be used as an independent power source to supply electric power to factories and buildings, etc. Further, even in the event of a large-scale disaster, when the electric power supply infrastructure is malfunctioning and there is no way to restore it, the power supply can continue to be used semi-permanently as a backup power source.

Incidentally, the present embodiment is only an example of the present invention, and the present invention is not limited to this form. That is, it goes without saying that the shape, dimensions, material, and number of each of its constitutional components can be changed as needed, as long as they are within the range where the action of the invention can be demonstrated.

Finally, the inventor's knowledge necessary for global size energy supply in the future based on the rapid changes in the current global environment, that is, fundamental measures against the problem of global warming caused by combustion energy, resolution of the problem of the depletion of fuel resources that are the source of energy needed to supply electricity, and resolution of the sudden collapse and loss of existing large-scale power generation energy infrastructures based on serious natural disasters such as the passage of huge typhoons and large sized low pressure caused by abnormal weather, the occurrence of torrential rains caused by linear rainfall belts, and the occurrence and attack of tornadoes, etc., and large earthquakes, etc., in the following.

As we move toward the year 2100, we are in an era that calls for change in the way we think about energy issues and the way we secure and maintain energy from the following perspectives. The inventor of the present invention believes that the future direction of power energy will be as follows.
(a) Toward an era of from use of alternating current (AC) to use of direct current (DC)
(b) Toward an era of changing in concept of small-scale electric power use and large-scale electric power use
(c) Toward an era of changing in transmission and distribution of electric power
(d) Toward an era of changing in concept of alternating current electric power generation
(e) Toward an era of no need for batteries associated with chemical reactions
(f) Toward an era of no need for high voltage and high electric power As for future progress, it appears that the direction will be as described above, and we are moving towards a way of thinking that calls for change in the times. Based on these facts, the inventor of the present invention is convinced that the trend of the times is such that expectations for the atomically induced power source device proposed by the inventor of the present invention took the lead in proposing will increase, and that the finding of "cost effectiveness" findings can be expected.

In the following, the technical significance of the present invention will be described for recapitulation. In fact, various countries around the world currently rely on nuclear power plants that utilize $^{235}U$ (uranium) as fuel to serve as a source of energy. However, $^{235}U$ (uranium) used in nuclear power plants contains only 0.7% of natural uranium as an isotope, and it is necessary to increase this content from 3% to 5% to be used as fuel.

Accompanied with this, in order to control the fission chain reaction of uranium (U) 235, it is necessary to install control rods that absorb neutrons and water as a neutron moderator to reduce the speed of neutrons, cooling water to remove the enormous amount of thermal energy generated by the chain reaction of nuclear fission to be taken out of the reactor, and backup facilities for emergency power source and moderator supply to prevent the nuclear fission reaction from going out of control due to unexpected external factors, that is, an extremely large-scale nuclear reactor and its surrounding facilities equipped with an emergency core cooling system that must be activated in the event of an emergency or urgent situation. In addition to this, a large-scale power transmission facility will be required to supply the electric power obtained from the nuclear power plant to urban areas, etc.

As can be seen from the above, exploitation and utilization of nuclear power plants today do not seem to be affected by "changes in the weather environment in the natural world," but they seem to expose problems of "environmental problems" and "cost-effectiveness" due to radioactivity. The inventor of the present invention has come up with to propose an invention that can fully meet the current situation and the demands that will be expected in the near future.

In the following, supplementary explanations provided by the inventor related to the present invention will be added to aid in understanding the present invention.
(1) Regarding Amount of Heat Generated Based on Nuclear Transmutation Reaction
(1-1) Regarding Reaction Mechanism In a "chemical reaction," the elements involved in the change remain as they are, and only the bonds between atoms change. In "each chemical reaction," a new nuclide is produced, but the nuclide is not necessarily the same element.
(1-2) Regarding Reaction Details U with an atomic number 92 (a mass number 238) emits 12,300 particles/S of "α particles" per 1 g. If it is 2 g, twice as many "α particles" are emitted. 7.7% of $^{238}U$ is 4.195 (MeV) and 23% is 4.147 (MeV).
(1-3) In Chemical Reactions Absorption and generation of heat will be per mole of "reactant" (several thousands to several tens of thousands of calories). This value is in the "α decay" of the "nucleus" of $^{238}U$. This is only one millionth of the energy radiated.
(1-4) In Nuclear Chemical Reaction of 92(238)U In terms of absorption and generation of heat, it is 1 (MeV)=$3.83 \times 10^{-14}$ (cal). It is 10,000 (cal)=$104/3.83 \times 10^{-14} \approx 2.6 \times 10^{17}$ (MeV). The heat of reaction of 10,000 (cal) per mole (mol) is 10,000 (cal/mol)=$2.6 \times 10^{-17}/6.02 \times 10^{23}$=$4.34 \times 10^{-7}$ (MeV/mol).

With respect to nuclear reactions, it is considered that, in many nuclear reactions, "compound nuclei" are created, and that the "compound nuclei" are excited to high energies and disintegrate in a time of about $10^{-12}$ to $10^{-14}$/S. Specifically, it is as follows.
(2) Regarding decay of natural radioactive materials
  (2-1) Nitrogen atom (N) with atomic number 7 and mass number 14: (target nuclide)+α particle (incident particle)→hydrogen atom (H) with atomic number 1 and mass number 1: (emitted particle)+oxygen atom (O) with atomic number 8 and mass number 17: (produced nuclide)
  (2-2) Nitrogen atom (N) with atomic number 7 and mass number 14: (target nuclide)+neutron (n) (incident particle)→carbon atom (C) with atomic number 6 and mass number 14+hydrogen atom (H) with atomic number 1 and mass number 1: (emitted particle)
  (2-3) Comparison between "chemical reaction" and "nuclear chemical reaction" is carried out. Regarding changes in the amount of substance and energy, in the "chemical reactions," changes in the amount (mol) of substance that can be weighed can be observed. On the other hand, in the "nuclear chemical reactions," the atomic transformation of individual atoms is delt with. That is, the energy change is expressed in electron volts (eV).

(2-4) Exothermic reactions due to nuclear reactions are as follows.

Decay of uranium (U: uranium) with atomic number 92 and mass number 238→thorium (Th) with atomic number 90 and mass number 232+α particle (atomic nucleus of helium (He))

(2-5) Mass loss due to decay is as follows
(i) The mass (mass) of uranium (U) above is 238.0289
(ii) The mass (mass) of thorium (Th) above is 232.0381
(iii) The mass (mass) of the α particles above is 4.0026
(iv) Based on the above, the mass loss due to decay is calculated as follows.

238.0289(mass of uranium above) − (232.0381(mass of thorium above) + 4.0026(mass of α particles above)) =

(+)1.9882 .... it is an exothermic reaction.

(here, (+): exothermic reaction, (−): endothermic reaction)
(3) Other General Matters Regarding nuclear transmutation reactions, in 1919, Rutherford published an experiment on the destruction of a nitrogen atom (N) with an atomic number 7 and a mass number 14, using an "α particle" to confirm that a proton (H) was ejected from the atomic nucleus. This nuclear transmutation reaction is shown below.
(Nuclear Transmutation Reaction Formula)

Nitrogen atom (N) with atomic number 7 and mass number 14+α particle (2(4)He)→proton (1(1))H)+oxygen atom (O) with atomic number 8 and mass number 17+energy E That is, the reaction in which an element is transformed is a "nuclear transmutation reaction," and energy (E) is released by the nuclear reaction.

Here, in the case of (+)E, it is an exothermic reaction, and in the case of (−)E, it is an endothermic reaction. And, E indicates a mass defect. Incidentally, although exothermic reaction and endothermic reaction also occur in so-called chemical reactions, they are completely different from the principles of the present invention.

As explained above, the inventor of the present invention has focused on a naturally occurring radioactive element that is abundant in the natural world, and among isotopes of uranium (U) with an atomic number 92, the nuclide $^{238}$U, a nuclide with a mass number 238, which has an extremely high abundance ratio of 99.2742% and a semi-permanent half-life of approximately 4.5 billion years, and also focused similarly on a naturally occurring radioactive element with an almost 100% abundance ratio and a half-life of approximately 14 billion years, and by applying the Seebeck effect, which is one of the properties, to these substance, an extremely significant technological achievement can be found out in conceiving an energy source with a simple configuration that is inexpensive and can be mass produced.

And, by implementing this invention, it can actually be realized as a so-called stand-alone type atomic induced voltage power source device, and this power source device can be supplied in various forms such as a module type that is portable at an individual level, a unit type, or a device type that can independently supply electric power singly to a specific facility or region.

According to this, it is possible to supply a small and portable atomically induced power generation device, rapidly and mass productively, that can permanently generate electricity itself as needed, in place of large infrastructure power generation devices that are irreversibly malfunctioning due to catastrophic damage caused by natural disasters, such as abnormal weather, or man-made disasters, such as deterioration of social conditions, and that are unable to recover.

Also, even in the event of natural disasters such as occurrence of a major earthquake and subsequent arrival of a tsunami, attack of a large typhoon, or outbreak of a large-scale tornado, or man-made disasters such as acts of terrorism against a nuclear power plant or sudden outbreaks of regional conflict or wars between nations, the power generation facilities and transmission systems that make up the existing massive infrastructure will malfunction, it is possible to help lives of the displaced people who have been isolated by such a situation and, in turn, to protect the displaced people's lives.

When further added, as mentioned above, with regard to $^{238}$U, it is very superior to other isotopes of uranium (U) in the points of existence ratio and half-life, but in the current situation, nuclear reactions are made by making fuel wrapped around plutonium ($^{239}$Pu) with an atomic number 94 in fast breeder reactors, but it is essential to use a coolant made from a liquefied alloy of group 1 elements sodium (Na) and potassium (K) so that there is a fundamental problem that sodium (Na) leaks outside and comes into contact with the air to cause a catastrophic accident, whereby it is a large-scale infrastructure power generation systems that still contains various problems in its realization. Therefore, in reality, various countries have attempted to realize this system at huge costs, but have ultimately failed.

In fact, in this country, with regard to the fast breeder reactor "Monju," leakage of sodium (Na) became a problem and the decision was made to decommission the reactor in 2016. That is, with regard to the fast breeder reactor that constitute this huge infrastructure, it is the current situation to continuously solve the problems associated with existing decommissioning process itself, rather than making progress in their development.

From the above-mentioned explanation, according to the present invention, it can be understood that it is an extremely innovative and excellent invention which enables inexpensive mass production and rapid mass supply based thereon, by effectively utilizing such $^{238}$U, to supply sufficient amount of energy while preventing global warming and environmental destruction, which are urgent issues to be solved on a global scale, whereby covering the lives and social activities of people all over the earth.

EXPLANATION OF REFERENCE NUMERALS 10 atomically induced voltage power generation type power source device (power source module)
10A(1), 10A(2), 10A(3), . . . Power supply module
10B(1), 10B(2), 10B(3), . . . Power supply module
100 High temperature side heating contact
200 Low temperature side heating contact
300 One conductor
301 One output terminal part
400 The other conductor
401 The other output terminal part
The invention claimed is:
1. A power source device utilizing radioactive energy due to α-decay which comprises a connected structure in which each one of ends of a first metal and a second metal each comprising a structure having one-end and an other end and comprising different kinds of metals suitable for generating Seebeck effect is connected in a conductive state through a one-end bonding part in which uranium (U) and thorium (Th) are supported on a carrier made of boron (B), and an other end side bonding part is connected in a conductive state through a bonding part at the other end in which uranium (U) and thorium (Th) are supported on a carrier made of carbon (C), the one-end side bonding part in which uranium (U) and thorium (Th) are supported on the carrier made of boron (B) is formed so that it is generated heat by α-decay of uranium (U) and thorium (Th) to raise the temperature to a first temperature, the other end side bonding part in which uranium (U) and thorium (Th) are supported on the carrier made of carbon (C) is formed so that it is generated heat by α-decay of uranium (U) and thorium (Th) to raise the temperature to a second temperature which is different from the first temperature, the first metal is provided with a first output terminal part, the second metal is provided with a second output terminal part which is different from the first output terminal part, and the power source device is a structure capable of outputting a current generated by the Seebeck effect based on a relative temperature difference through the one-end side bonding part that has risen to the first temperature and the other end side bonding part that has risen to the second temperature as an atomic induced voltage power source device through the first output terminal part and the second output terminal part.

2. A power generation method utilizing radioactive energy due to α-decay which comprises preparing a first metal and a second metal, each having a form of one-end and an other end, and comprising different kinds of metals suitable for generating a Seebeck effect, connecting each one of the one-end and the other end of the first metal and the second metal in a conductive state through a one-end bonding part in which uranium (U) and thorium (Th) are supported on a carrier made of boron (B), and connecting an other end side bonding part in a conductive state through a bonding part at the other end in which uranium (U) and thorium (Th) are supported on a carrier made of carbon (C), generating heat at the one-end side bonding part in which uranium (U) and thorium (Th) are supported on the carrier made of boron (B) by α-decay of uranium (U) and thorium (Th) to raise to a first temperature, generating heat at the other end side bonding part in which uranium (U) and thorium (Th) are supported on the carrier made of carbon (C) by α-decay of uranium (U) and thorium (Th) to raise to a second temperature which is different from the first temperature, conductively connecting a first output terminal part to the first metal, and conductively connecting a second output terminal part to the second metal, and utilizing, as a power source, a current generated by the Seebeck effect based on a relative temperature difference through the one-end side bonding part that has risen to the first temperature and the other end side bonding part that has risen to the second temperature through the second output terminal part which is different from the first output terminal part conductively connected to the first metal and the second output terminal part conductively connected to the second metal.

3. The power source device utilizing radioactive energy due to α-decay according to claim 1, characterized in that the uranium (U) comprises a naturally radioactive element with a mass number 238, which is a nuclide of an isotope of uranium, and the thorium (Th) comprises a naturally radioactive element with a mass number 232.

4. The power generation method utilizing radioactive energy due to α-decay according to claim 2, characterized in that the uranium (U) comprises a naturally radioactive element with a mass number 238, which is a nuclide of an isotope of uranium, and the thorium (Th) comprises a naturally radioactive element with a mass number 232.

5. The power source unit utilizing radioactive energy due to α-decay according to claim 1, which comprises having a plurality of the atomic induced voltage power source devices, and desired electric power being capable of generating by electrically connecting each of the atomic induced voltage power source devices to each other in series or in parallel.

6. The power generation method utilizing radioactive energy due to α-decay according to claim 2, which comprises having a plurality of power sources formed by the power generation method as atomic induced voltage power source devices, and desired electric power being capable of generating by electrically connecting each of the atomic induced voltage power source devices to each other in series or in parallel.

7. The power source unit utilizing radioactive energy due to α-decay according to claim 3, which comprises having a plurality of the atomic induced voltage power source devices, and desired electric power being capable of generating by electrically connecting each of the atomic induced voltage power source devices to each other in series or in parallel.

8. The power generation method utilizing radioactive energy due to α-decay according to claim 4, which comprises having a plurality of power sources formed by the power generation method as atomic induced voltage power source devices, and desired electric power being capable of generating by electrically connecting each of the atomic induced voltage power source devices to each other in series or in parallel.

* * * * *